(12) United States Patent
Pasternak

(10) Patent No.: US 10,527,493 B2
(45) Date of Patent: Jan. 7, 2020

(54) SPECTROPHOTOMETRIC DEVICE WITH A PLURALITY OF SPECTRAL MEASUREMENT BANDS

(71) Applicant: AIRBUS DEFENCE AND SPACE SAS, Toulouse (FR)

(72) Inventor: Frédéric Pasternak, Toulouse (FR)

(73) Assignee: AIRBUS DEFENCE AND SPACE SAS, Toulouse (FR)

(*) Notice: Subject to any disclaimer, the term of this patent is extended or adjusted under 35 U.S.C. 154(b) by 0 days.

(21) Appl. No.: 16/341,278

(22) PCT Filed: Sep. 29, 2017

(86) PCT No.: PCT/FR2017/052672
§ 371 (c)(1),
(2) Date: Apr. 11, 2019

(87) PCT Pub. No.: WO2018/069598
PCT Pub. Date: Apr. 19, 2018

(65) Prior Publication Data
US 2019/0339125 A1    Nov. 7, 2019

(30) Foreign Application Priority Data

Oct. 13, 2016 (FR) .................................. 16 59920

(51) Int. Cl.
*G01J 3/42* (2006.01)
*G01J 3/02* (2006.01)
(Continued)

(52) U.S. Cl.
CPC .......... *G01J 3/0256* (2013.01); *B64G 1/1021* (2013.01); *G01J 3/0208* (2013.01);
(Continued)

(58) Field of Classification Search
CPC ........ G01J 3/02; G01J 3/42; G01J 3/28; G01J 2003/2866; G01N 21/274
(Continued)

(56) References Cited

U.S. PATENT DOCUMENTS 7,561,326 B2 *  7/2009  Funk .......................... G01J 3/02
                                                        359/368
2002/0030894 A1 *  3/2002  Volcker ................ G01N 21/253
                                                        359/619
(Continued)

OTHER PUBLICATIONS

English Translation of the Written Opinion of the ISA for PCT/FR2017/052672, dated Jan. 15, 2018, five pages.
(Continued)

*Primary Examiner* — Md M Rahman
(74) *Attorney, Agent, or Firm* — Nixon & Vanderhye P.C.

(57) ABSTRACT

A spectrophotometric device is disclosed having a plurality of spectral measurement bands including a single telescope and a single spectrophotometer. The plurality of spectral bands is obtained by placing pupillary separating prisms at an entrance pupil of the telescope, and by using spectral band selection filters. Such a device has a lower weight, smaller dimensions, and a lower price. In particular, it may be integrated into a satellite, in particular for a mission to characterize flows of carbon compounds that are produced on the Earth's surface.

12 Claims, 4 Drawing Sheets

(51) Int. Cl.
*G01J 3/04* (2006.01)
*G01J 3/28* (2006.01)
*B64G 1/10* (2006.01)
*G01J 3/22* (2006.01)
*G02B 23/02* (2006.01)

(52) U.S. Cl.
CPC ........... *G01J 3/0224* (2013.01); *G01J 3/0229* (2013.01); *G01J 3/0294* (2013.01); *G01J 3/04* (2013.01); *G01J 3/22* (2013.01); *G01J 3/2803* (2013.01); *B64G 2001/1028* (2013.01); *B64G 2001/1042* (2013.01); *G02B 23/02* (2013.01)

(58) Field of Classification Search
USPC ......................................................... 356/319
See application file for complete search history.

(56) References Cited

U.S. PATENT DOCUMENTS

2006/0012871 A1\* 1/2006 Funk .......................... G01J 3/02
 359/385
2006/0038997 A1 2/2006 Julian et al.

OTHER PUBLICATIONS

International Search Report for PCT/FR2017/052672, dated Jan. 15, 2018, 2 pages.
French Written Opinion of the ISA for PCT/FR2017/052672, dated Jan. 15, 2018, 11 pages, and the English language Translation of the Written Opinion.
Pascal et al., "An Improved Microcarb Dispersive Instrumental Concept for the Measurement of Greenhouse Gases Concentration in the Atmosphere", Oct. 7-10, 2014, XP055390649, 8 pages.

\* cited by examiner

SPECTROPHOTOMETRIC DEVICE WITH A PLURALITY OF SPECTRAL MEASUREMENT BANDS

CROSS RELATED APPLICATIONS

This application is the U.S. national phase of International Application No. PCT/FR2017/052672 filed Sep. 29, 2017, which claims priority to French Patent Application No. 16 59920 filed on Oct. 13, 2016, the entire contents of each of which are hereby incorporated by reference.

The present invention relates to a spectrophotometric device with a plurality of spectral measurement bands, and to a method for measuring chemical components that are present in the Earth's atmosphere.

To better understand the evolution of the Earth's climate system, space missions are planned to characterize the flows of carbon compounds that occur between the atmosphere, the oceans, and the land masses of the Earth. For this purpose, spectrophotometric measurements must be performed from a satellite in orbit around the Earth, in spectral bands that contain absorption lines of gaseous carbon compounds, particularly greenhouse effect compounds such as dioxide carbon ($CO_2$) or aerosol compounds. However, to obtain the maximum amount of information while reducing the cost of the mission, the spectrophotometric device that is used must provide an optimum compromise between the number of spectral bands in which spectrophotometric measurements can be performed simultaneously, and the weight, size, and price of the spectrophotometric device.

In the OCO 2 instrument launched in 2014, three absorption bands of carbon dioxide ($CO_2$) are analyzed using three high resolution spectrometers, which are fed by a shared telescope.

For the MicroCarb instrument, CNES (ICSO 2014 "Improved Microcarb concept" Pascal Véronique et al.) proposed using a diffraction echelle grating spectrometer at high orders of diffraction to cover a plurality of narrow spectral bands in order to analyze key atmospheric components. As the different orders of diffraction are superimposed in the image of the focal plane, it is necessary to implement a system to separate them. In order to obtain a simpler and more compact instrument, and also to cover a large number of spectral bands, CNES proposed separating the spectral bands by using a crossed grating inserted into the optical path. This grating enables spreading the wavelengths in the direction perpendicular to the direction of spectral dispersion which is defined by the main echelle grating. Each order of dispersion of the main grating is then projected onto a column of the array of the detector, next order being shifted in the perpendicular direction. It is thus possible to capture all the spectral bands on two array detectors in two perpendicular directions.

This concept makes it possible to observe a plurality of spectral bands, and in addition it naturally rejects out-of-band wavelengths. However, if the spectral bands of interest for the mission are not adjacent, the total extent of the spectral dispersion may exceed the available surface of the detector array. To at least partially compensate for this effect, CNES also proposed using the crossed grating for multiple orders, so as to "shift back" the farther wavelengths onto the detector array surface. However, a superposition of orders of diffraction then occurs again, as well as a risk of ghosting, which diminishes the initial advantage of the crossed grating.

To further improve the compactness of this type of instrument while maintaining or improving the accuracy of the measurements, a first aspect of the invention provides a spectrophotometric device with a plurality of spectral measurement bands, which comprises:

a telescope having an entrance pupil and an output focal plane, adapted to focus, in the output focal plane, radiation that enters the telescope through the entrance pupil;

a spectrophotometer having an entrance which is superimposed on the output focal plane of the telescope, and comprising a spectral spreading component and an array detector which is optically conjugate with the entrance of the spectrophotometer.

The detector has a photosensitive surface which extends in a first detection direction parallel to a direction of spectral spreading produced by the spectral spreading component, and which also extends in a second detection direction perpendicular to the first detection direction.

According to the invention, the spectrophotometric device further comprises:

a pupil mask arranged in the entrance pupil of the telescope and having a plurality of apertures forming separate sub-pupils which are respectively dedicated to the spectral measurement bands;

pupillary separating prisms, which are arranged one-on-one against the apertures of the pupil mask so that each pupillary separating prism deflects a portion of the radiation which passes through the corresponding sub-pupil in a prismatic deflection direction which is common to all the pupillary separating prisms, and with a prismatic deflection amplitude which is different from that of every other pupillary separating prism, and the spectrophotometer being oriented relative to the pupillary separating prisms so that the second detection direction optically corresponds to the prismatic deflection direction through the telescope and the spectrophotometer, a plurality of slits, possibly curved, which are distributed in the entrance of the spectrophotometer so that the longitudinal direction of each slit optically corresponds to the prismatic deflection direction through the telescope, and the slits being offset from one another so that each receives through one of the apertures of the pupil mask and one of the pupillary separating prisms, and through the telescope, a respective portion of the radiation which originates from a pointing direction of the telescope; and a first set of filters, each determining one of the spectral measurement bands, the filters of the first set being arranged in front of the photosensitive surface of the detector, each filter of the first set being effective within a detection aperture which is superimposed along the second detection direction on an image of only one of the slits, formed by the spectrophotometer with a portion of the radiation entering the telescope through a single one of the apertures of the pupil mask, and the detection aperture of each filter extending in the first detection direction.

Thus, in a spectrophotometric device according to the invention, each spectral measurement band is determined by one of the apertures of the pupil mask which is placed in the entrance pupil of the telescope, by the pupillary separating prism and the slit which are associated with this aperture of the pupil mask, as well as by one of the filters positioned in front of the array detector. The spectrophotometric device therefore comprises a single telescope, a single spectrophotometer, and a single detector, which are shared for all spectral measurement bands. For this reason, the weight, the dimensions, and the price of the spectrophotometric device are reduced relative to the plurality of spectral bands in which spectrophotometric measurements can be made simultaneously.

Downstream of the pupillary separating prisms, everything occurs as if each band were associated with a different viewing direction. Registration of the different bands is done at the pupillary separating prisms.

Separate portions of the photosensitive surface of the array detector are therefore assigned one-to-one to the spectral bands defined by the filters which themselves are positioned in front of those portions of the photosensitive surface of the array detector. This greatly simplifies filtering and makes it more efficient, with the ability to supplement with specific filters arranged upstream of the spectral spreading component.

The device of the invention thus allows freedom of choice in the positioning of spectral bands on the array of the detector, ease in accommodating a larger number of bands, good inter-band rejection, and excellent performance in stray light rejection. The pupil dimensions may be independently adapted for each band, particularly for the purposes of diffraction homogeneity. Finally, it is possible for the field curvature of the telescope to compensate for that of the spectrophotometer.

Thus, no mixing or accumulation occurs in the results of the spectrophotometric measurements, between radiation portions that belong to separate spectral bands.

The improvements to the device of the invention which are now mentioned are optional and may be implemented independently of one another or in combination.

To further reduce transfers of radiation that could still occur between one of the spectral bands and the portion of the detector dedicated to a different spectral band, for example due to stray reflections of radiation within the device, the device may further comprise at least a second set of filters, which also have a one-to-one correspondence to the spectral measurement bands. The filters of this second set may be arranged at the pupillary separating prisms or inside the spectrophotometer between its entrance and the spectral spreading component. Then, a filter of the first set and a filter of each second set which correspond to the same spectral band are traversed by a same portion of the radiation which has entered the telescope through only one of the apertures of the pupil mask.

Again with the aim of reducing transfers of radiation that could occur between one of the spectral bands and the portion of the detector dedicated to a different spectral band, the device may also comprise at least one field mask which is arranged close to the output focal plane of the telescope or in an intermediate image plane of the telescope. Each field mask has apertures which correspond to the slits or which have images superimposed on the slits, these images being formed by a part of the telescope comprised between the field mask and the output focal plane of the telescope, with the radiation that entered the telescope through the apertures of the pupil mask.

To reduce the size of the spectral spreading component, the device may further comprise a set of additional prisms, referred to as pupillary alignment prisms, which are arranged against the slits. These pupillary alignment prisms are then adapted to superimpose onto each other, on the spectral spreading component, all radiation portions coming from all the slits after each has entered the telescope through one of the apertures of the pupil mask.

In preferred embodiments of the invention, the spectral spreading component may be a diffraction grating. The spectrophotometer may then be arranged so that the radiation which has entered the telescope through the apertures of the pupil mask is reflected by the diffraction grating. Even more preferably, in particular in order to further reduce the space occupied by the spectrophotometer, the latter may have a configuration referred to as near-Littrow. In such a configuration, the incident radiation on the diffraction grating and the radiation which emerges from said grating have optical paths which are close for at least a portion of these optical paths. In particular, the incident radiation on the diffraction grating and the radiation which emerges from the same diffraction grating are reflected by the same mirrors of the spectrophotometer, having a collimating function for the incident radiation and a focusing function for the emerging radiation.

Advantageously, the device may further comprise a polarization scrambler which is arranged upstream of the entrance pupil of the telescope relative to a direction of propagation of the radiation in the telescope. Such a polarization scrambler mixes different polarizations in each portion of the radiation which passes through one of the apertures of the pupil mask.

In general, a device according to the invention may comprise at least N apertures in the pupil mask, N pupillary separating prisms, N slits, and N filters in each set of filters, and also N pupillary alignment prisms where appropriate, to enable simultaneous spectrophotometric measurements in N spectral bands, where N is an integer between 2 and 12, or equal to 2 or 12, preferably between 4 and 8, or equal to 4 or 8.

The telescope may be of a three-mirror type.

According to another optional improvement of the invention, the pupil mask may comprise an additional aperture, and the device may further comprise an imaging system and a beam splitting component which is arranged in an exit pupil of the telescope. The beam splitting component is adapted so that an additional portion of the radiation which entered the telescope through the additional aperture of the pupil mask is transmitted to the imaging system, while the portions of the radiation which entered the telescope through the apertures of the pupil mask (referred to in this manner to this point), are transmitted in the direction of the slits. The telescope of the device can thus be shared by the spectrophotometer and an optional imaging path.

In addition, a second aspect of the invention provides a method for measuring chemical components present within a measurement area in the Earth's atmosphere, said method comprising the steps of:

/1/ installing on board a satellite a spectrophotometric device with a plurality of spectral measurement bands according to the first aspect of the invention;

/2/ placing the satellite in orbit around the Earth, so that the satellite flies over the measurement area;

/3/ orienting the pointing direction of the telescope towards the measurement area; and /4/ while the pointing direction of the telescope is maintained towards the measurement area, activating the detector of the spectrophotometer and capturing readout signals from pixels of the detector, these readout signals providing, separately within geometric bands in the photosensitive surface of the detector which are optically associated one-to-one with the slits through the spectrophotometer, a spectral intensity distribution of the radiation which originates from the measurement area in one of the spectral measurement bands.

Preferably, the satellite may be oriented so that the pointing direction of the telescope is superimposed on a nadir direction of the satellite during step /4/. The measurements can thus precisely concern a vertical column of atmosphere located between the satellite and the land or ocean surface.

Again preferably, the satellite may be oriented so that the prismatic deflection direction is perpendicular to an advancement direction of an image of the measurement area formed by the telescope in the output focal plane during step /4/. Such an orientation allows capturing multiple measurement points perpendicularly adjacent to the path in the case of a line of sight which is aimed towards the nadir, while limiting the impact of image blurring due to advancement.

Finally, particularly for space missions which are intended to characterize flows of carbon compounds that are occurring on the Earth's surface, at least one of the spectral measurement bands of the device may comprise an absorption line of at least one gaseous carbon compound, such as carbon dioxide or an aerosol compound.

Other features and advantages of the invention will be apparent from the following description of some non-limiting exemplary embodiments, with reference to the accompanying drawings in which.

For clarity, the dimensions of the elements represented in these figures do not correspond to actual dimensions or to actual dimension ratios. Furthermore, identical references in different figures denote identical elements or elements that have identical functions.

Figure 1:
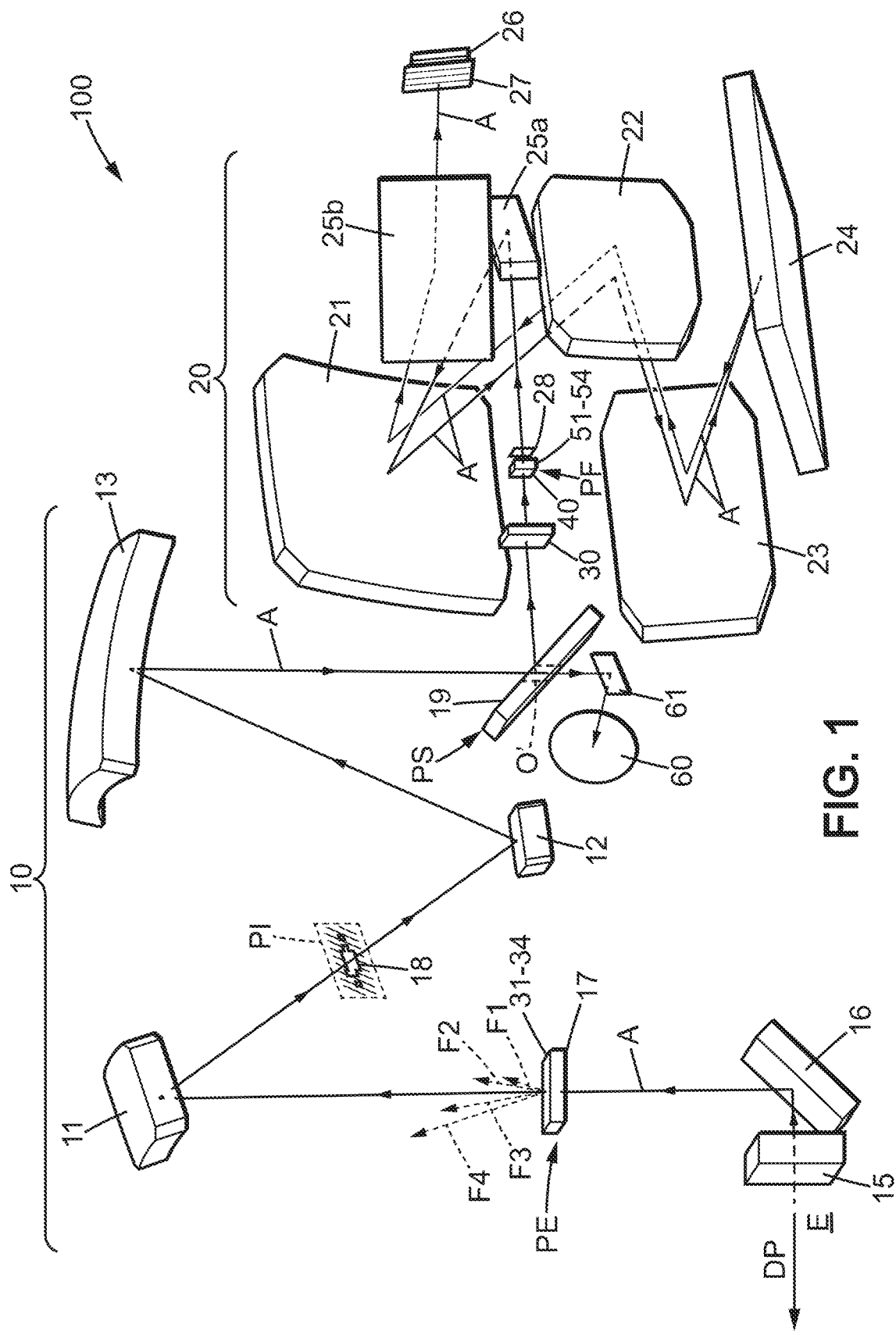
FIG. 1 is a perspective schematic diagram of a spectrophotometric device providing multiple spectral measurement bands, which is in accordance with the invention.

In accordance with FIG. 1, a spectrophotometric device according to the invention, generally designated by the reference 100, comprises a telescope 10 and a spectrophotometer 20. The directed continuous line which is designated by A indicates the optical axis of device 100, oriented to follow the direction of propagation of the radiation.

The telescope 10 may be one of the models known to the skilled person, for example a three-mirror model as shown. In particular, it may be a Korsch telescope. The letter E denotes the entrance for the radiation entering the telescope 10, DP denotes the pointing direction of the telescope 10, PF denotes the output focal plane of the telescope 10, and the other references have the following meanings:

11, 12, 13 the primary, secondary, and tertiary mirrors respectively, of the telescope 10
15 optional polarization scrambler
16 optional deflecting mirror
PE entrance pupil of the telescope 10
PS exit pupil of the telescope 10
17 pupil mask arranged in the entrance pupil PE
18 optional field mask
19 optional beam splitting component, arranged in the exit pupil PS In a known manner, the telescope 10 may form an intermediate image of a scene that is located at great distance from the entrance E in the pointing direction DP. This intermediate image is then located in an intermediate focal plane PI of the telescope 10, between the primary mirror 11 and the secondary mirror 12 in the type of telescope represented.

The polarization scrambler 15 and the deflecting mirror 16 are optional and arranged at the entrance E of the telescope 10. It is possible for only one of these two optical components to be used in the device 100. Their implementations are also known for the skilled person, so it is not necessary to describe them again.

In the exemplary embodiment of the invention that is represented, the entrance pupil PE is located upstream of the primary mirror 11 with respect to the direction of propagation of the radiation entering the telescope 10 through the entrance E. The exit pupil PS is the image of the entrance pupil PE after the succession of the three mirrors 11, 12, and 13.

By the principle of optical conjugation in the telescope 10, a beam of radiation which originates from a remote source in the pointing direction DP and enters the telescope through the entrance E, is focused in the output focal plane PF.

Figure 2:
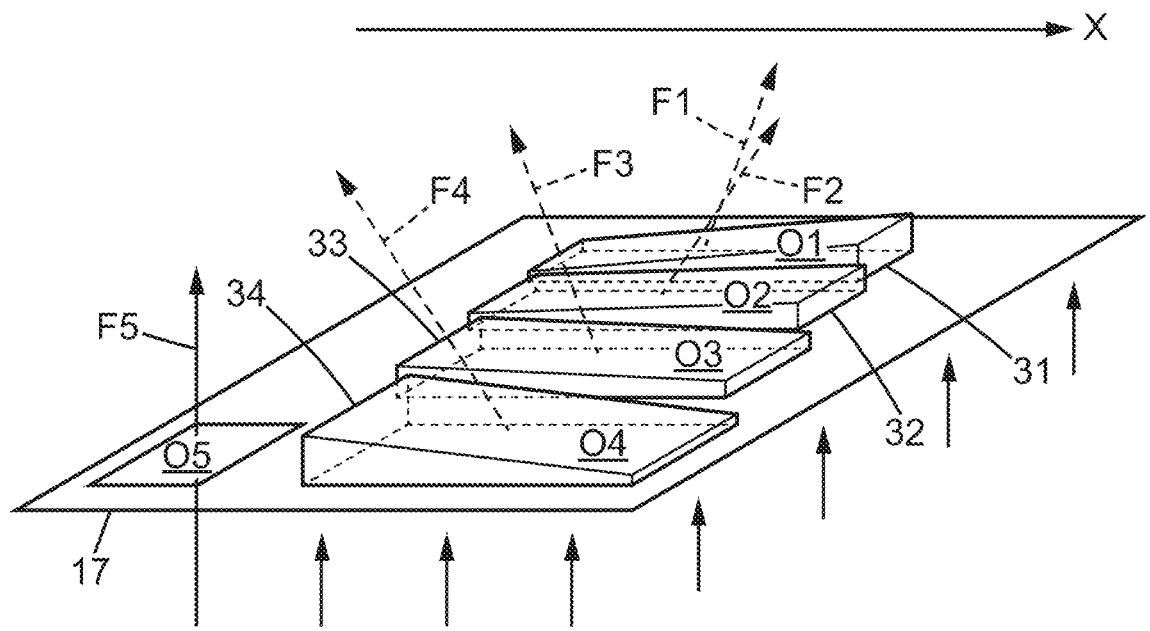
FIG. 2 shows a possible configuration of a pupil mask that can be used in a spectrophotometric device according to the invention, and which is associated with the pupillary separating prisms.

The pupil mask 17 is arranged in the entrance pupil PE, and has several separate apertures which are distributed within the entrance pupil PE. The positions and dimensions of these apertures in the entrance pupil PE may vary between different embodiments of the device 100, particularly on the basis of radiometric and spectral criteria of the radiation, as well as size constraints and allowing beams to pass through the telescope 10 unobstructed. In FIG. 2, O1-O4 denote four apertures of the pupil mask 17, for a device 100 with four spectrophotometric measurement bands which is used for illustrative purposes in the present description. As explained below, the apertures O1-O4 of the pupil mask 17 are dedicated one-to-one to the spectral bands of the spectrophotometric measurements. The additional aperture O5 shown in FIG. 2, which is optional and has no pupillary separating prism, does not correspond to a spectral band of spectrophotometric measurement and its usefulness will be described later. Each of the apertures of the pupil mask 17 thus forms a separate sub-pupil within the entrance pupil PE.

Pupillary separating prisms are arranged one-to-one against each of the apertures O1-O4 of the pupil mask 17, and are designated by the references 31-34 in FIG. 2 for the considered example of four spectral measurement bands. Each of the pupillary separating prisms 31-34 completely covers the corresponding aperture of the pupil mask, so that the beam of radiation which passes through this aperture is fully deflected by the prism according to the apex angle and orientation of the prism. The deflected outgoing beams from the pupillary separating prisms 31-34 are represented by broken lines in FIGS. 1 and 2, and the deflected beams are designated by the references F1-F4. The deflections produced by the pupillary separating prisms 31-34 differ from each other in at least one direction which is denoted X in FIG. 2. All the beams of radiation F1-F4 which pass through one of the apertures O1-O4 of the pupil mask 17 then converge at separate respective locations of the output focal plane PF, these locations being determined by the beam deflections produced by the pupillary separating prisms 31-34. These convergence locations in the output focal plane PF are offset in parallel to a direction x which corresponds to the direction X through the reflections on the mirrors 11, 12, and 13. For this reason, the directions X and x can together be designated as the prismatic deflection direction.

According to an improvement of the device 100, a first field mask 18 may be arranged in the intermediate focal plane PI. This first field mask 18 has apertures which correspond, by optical conjugation through mirrors 12 and 13, to slits arranged in the output focal plane PF and described below. Such a first field mask 18 limits the angular field of the device 100 around the pointing direction DP, with peripheral margins to avoid obstructing useful portions of the beams of radiation coming from the apertures O1-O4 of the pupil mask 17, including the additional aperture O5 where appropriate.

The optional component 19 which is arranged in the exit pupil PS may be a simple mirror for bending the beams of radiation F1-F4. But when the pupil mask 17 has the additional aperture O5, the component 19 may be adapted to direct the beam of radiation that comes from this extra aperture O5, designated by F5 in FIG. 2, towards an auxiliary imaging system 60, separately from the other beams F1-F4 coming from apertures O1-O4. For this reason, component 19 is called the beam splitting component in the general part of this description. The imaging system 60, which is also optional, can then capture an image formed by the telescope 10 of a scene that is in the pointing direction DP. For example, the beam splitting component 19 may be a plane mirror with an aperture O' which is located in the exit pupil PS at the location of the image from the additional aperture O5 which is formed by the mirrors 11, 12, and 13. In the particular embodiment of the invention represented in FIG. 1, an auxiliary bending mirror 61 is used between the beam splitting component 19 and the imaging system 60. One will recall that the imaging path composed of the additional aperture O5 of the pupil mask 17, the beam splitting component 19, and the imaging system 60 with the auxiliary bending mirror 61 where applicable, is not essential to the invention nor is it linked to the principle thereof. When this imaging path is provided, it may be advantageous to eliminate the effect of the polarization scrambler 15 in the additional aperture O5, for example by providing a hole in the polarization scrambler 15 at the area of passage of the beam of radiation F5 which enters the telescope 10 through the additional aperture O5.

Figure 3:
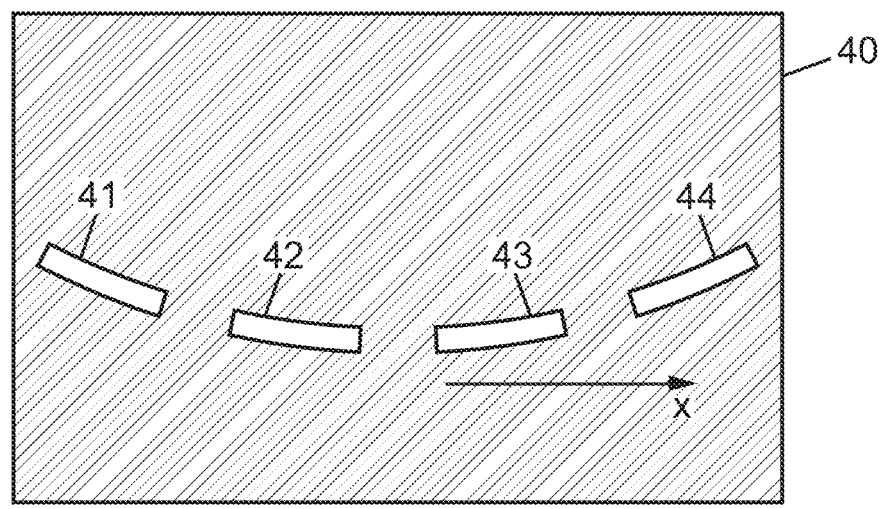
FIG. 3 is a view in the output focal plane of the telescope, for a spectrophotometric according to the invention.

A slit mask 40 is arranged in the output focal plane PF of the telescope 10. FIG. 3 is therefore a plan view of the mask 40. It is opaque to radiation outside the slits, and includes as many slits as there are spectral bands of the device 100. The slits, designated by the references 41-44, are arranged at the areas of convergence of the beams of radiation respectively coming from the apertures O1-O4 of the pupil mask 17 after deflection by the pupillary separating prisms 31-34. The slits 41-44 are therefore offset from each other along the prismatic deflection direction x, and are also substantially longitudinally oriented in this direction. The offsets between the slits 41-44 parallel to the x direction are thus determined by the apex angles of the pupillary separating prisms 31-34. All the slits 41-44 preferably have the same length, but two successive slits along direction x may possibly come together to form a continuous slit.

It is possible for the slits 41-44 to be slightly curved, so that they follow a field curvature which is due to the spectrophotometer 20. In this case, the field curvature of the spectrophotometer 20 may be offset by an identical field curvature produced by the telescope 10.

Another field mask (not shown) may be located upstream of the slit mask 40 relative to the direction of propagation of the radiation, a few millimeters in front of the slit mask 40. This other field mask has apertures which correspond to the slits 41-44, and provides an additional limitation to the angular field of the device 100 around the pointing direction DP.

Figure 4:
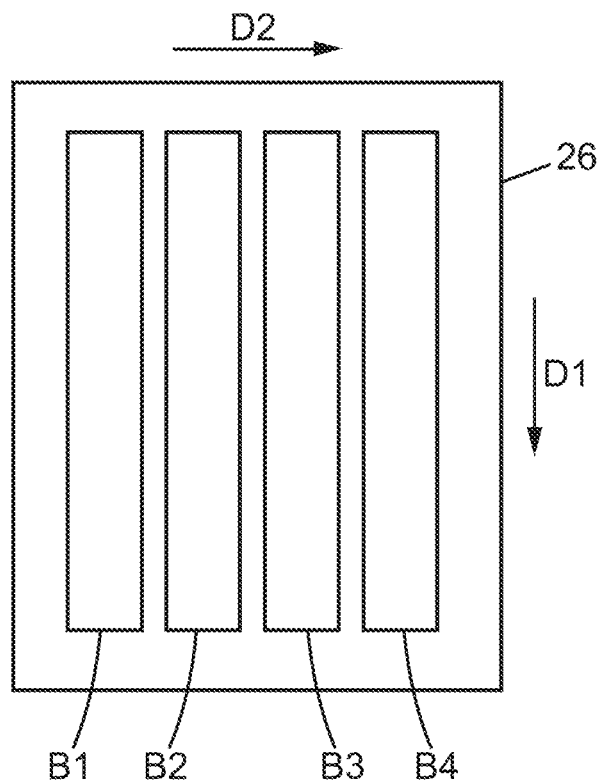
FIG. 4 illustrates the use of the photosensitive surface of an array detector which is used in a spectrophotometric device according to the invention.

The spectrophotometer 20 may be one of the types known to the skilled person, but a near-Littrow configuration is particularly advantageous in order to reduce the dimensions of the spectrophotometer. For example, as shown in FIG. 1, the spectrophotometer 20 may include three mirrors 21, 22, and 23 for collimating the beams of radiation F1-F4 exiting the slits 41-44, a blazed diffraction grating 24 operating by reflection, and an array image detector 26. The blazed diffraction grating 24 forms the spectral spreading component mentioned in the general part of this description. In the near-Littrow configuration, the beams F1-F4 which exit the slits 41-44 are reflected by the diffraction grating 24 towards the succession of mirrors 21-23, along an optical path that is close to the one traveled to reach the diffraction grating 24 from the slits 41-44, but with the reverse direction of propagation of the radiation. The slits 41-44 are then imaged by the spectrometer 20 on the photosensitive surface of the detector 26. The grating 24 produces a diffraction of the beams of radiation F1-F4 exiting the slits 41-44, resulting in a spreading of the image from each of the slits 41-44 on the detector 26, parallel to a common direction called the spectral spreading direction. The spectrophotometer 20 is oriented with respect to the pupillary separating prisms 31-34 so that the spectral spreading direction is perpendicular to the image of prismatic deflection direction x which is formed by the spectrophotometer 20 on the detector 26. FIG. 4 shows the image content which thus appears on the photosensitive surface of the detector 26. It consists of four geometric bands B1-B4 which each originate from the image from one of the slits 41-44 through the spectrophotometer 20. Each geometric band is therefore based on the image from the corresponding slit, and extends parallel to the spectral spreading direction. The geometric bands B1-B4 are offset relative to one another perpendicularly to the spectral spreading direction, in accordance with the prismatic deflections produced by the pupillary separating prisms 31-34. The spectral spreading direction was called the first detection direction in the general part of this description, and is denoted by D1 in FIG. 4. The direction perpendicular to D1, denoted D2 and called the second detection direction, is optically conjugate with the prismatic deflection direction x.

The assignment of the geometric bands B1-B4 so formed on the photosensitive surface of the detector 26, to spectral bands of spectrophotometric measurement, is achieved by a set of filters 27, referred to as the first set of filters. The filters of set 27 are maintained directly in front of the photosensitive surface of the detector 26, and each filter covers the entire corresponding geometric band. Thus, the radiation which is detected by the detector 26 in one of the geometric bands B1-B4 is limited to the spectral bandwidth of the filter of this set 27 which is covering this geometric band. The transition from one pixel of the photosensitive surface of the detector 26 to the next pixel in the detection direction D1 corresponds to a variation of wavelength within the spectral band of the filter beneath which these pixels are located. Thus, reading the pixels in a same column of the detector 26, parallel to the detection direction D1 within one of the geometric bands B1-B4, provides an evaluation of the spectral intensity distribution of the radiation in the spectral band which corresponds to this geometric band. Simultaneously, the transition from one spectral band of spectrophotometric measurement to another corresponds to a movement along the detection direction D2 in order to change geometric band. At the detector 26, the angular field of the device 100 around the pointing direction DP is limited by the lengths of the slits 41-44, but may also be limited in a supplemental manner by a selection, along the detection direction D2, of which pixels are actually read within each of the geometric bands B1-B4. Possibly, the readout signals which come from selected pixels aligned in the detection direction D2, but belong to the same band of the geometric bands B1-B4, may be added together in order to increase the signal-to-noise ratio. Preferably, a plurality of groups of adjacent pixels may be defined, which provides spatial information and therefore measurements on adjacent columns in the atmosphere. Thus, if there are p pixels for each band, and measurements for q columns in the atmosphere are desired, it is sufficient to define q groups of p/q adjacent pixels each (for example p=300 and q=3 groups of 100 adjacent pixels each provide three measurements of columns in the atmosphere).

Possibly, additional sets of filters which have spectral characteristics identical to those of the filters of the first set 27 may be arranged at the entrance pupil PE of the telescope 10 and at the slits 41-44, or at only one of these two locations. Such additional filters when arranged at the entrance pupil PE are assigned one-to-one to each of the apertures O1-O4 of the pupil mask 17. For example, they may be carried by the pupillary separating prisms 31-34. Of course, the additional filter which is assigned to each of the apertures O1-O4 must be identical or compatible with the filter of the first set 27 in following the one among the beams of radiation F1-F4 which exits this aperture and travels through the device 100 to the detector 26. The same condition applies to additional filters which are arranged at or near the slits 41-44.

FIG. 1 further shows two optional deflecting mirrors 25*a* and 25*b*, which are used to laterally shift the slit mask 40 on the one hand and the detector 26 with the set of filters 27 on the other hand, with respect to mirror 21, in opposite directions. Thus, along the path of the beams of radiation F1-F4 towards the diffraction grating 24, deflecting mirror 25*a* is located between the slit mask 40 and mirror 21, and along the path of the beams of radiation F1-F4 returning from the diffraction grating 24, deflecting mirror 25*b* is located between mirror 21 and the set of filters 27. Such a configuration solves the encumbrance issues, particularly when the spectrophotometer 20 is contained in a cryostat protecting against secondary heat radiation. An optical window of the cryostat, which is traversed by the beams of radiation F1-F4 leaving the tertiary mirror 13 of the telescope 10, may be located between the exit pupil PS and the output focal plane PF of the telescope 10. Such a cryostat window is designated by the reference 30 in FIG. 1.

Figure 5:
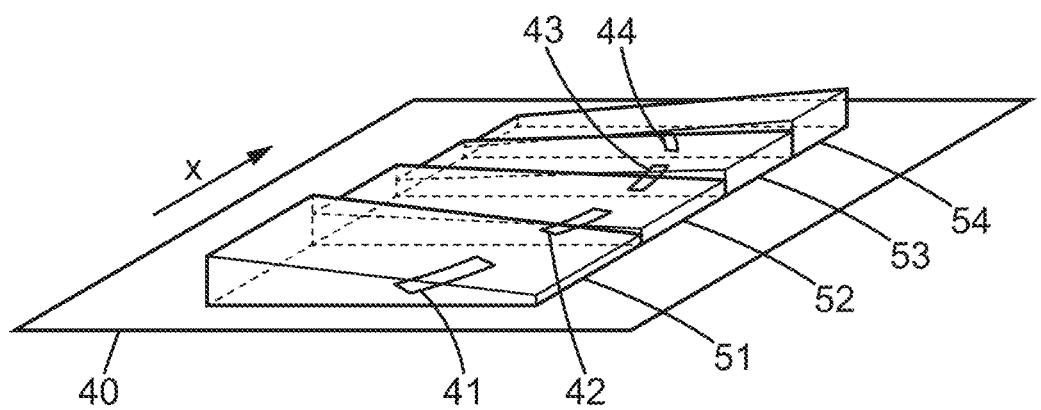
FIG. 5 is a perspective view corresponding to FIG. 3, and which shows an implementation of pupillary alignment prisms.

Due to the offsets of the sub-pupils within the entrance pupil PE of the telescope 10, the beams of radiation F1-F4 which form the geometric bands B1-B4 on the detector 26 may be transversely distanced from one another at the diffraction grating 24. It is then possible that these distances between beams require the diffraction grating 24 to have dimensions so large that it occupies a problematic amount of space, possibly too large to be manufactured. To resolve this difficulty, additional prisms 51-54, called pupillary alignment prisms and visible in FIG. 5, may be arranged one-to-one against the slits 41-44, preferably on the side of the spectrophotometer 20. Thus the pupillary alignment prisms 51-54 do not alter the positions of the geometric bands B1-B4 on the photosensitive surface of the detector 26, but allow superimposing the beams of radiation F1-F4 onto one another at the diffraction grating 24, or at least bringing them closer together. The diffraction grating 24 can thus be of reduced size. Where appropriate, each of the pupillary alignment prisms 51-54 may have an additional filter as mentioned above, in correlation with the spectral measurement band which corresponds to the slit against which the pupillary alignment prism is arranged. Optionally, each pupillary alignment prism may be slightly inclined in order to superimpose the entrance pupil of the spectrophotometer 20 more precisely on the images formed by the telescope 10 from the apertures O1-O4 of the pupil mask 17, corresponding to the exit sub-pupils of the telescope.

A mask with apertures 28 may also be arranged downstream of the pupillary alignment prisms 51-54 relative to the direction of propagation of the radiation, within a few millimeters of the prisms 51-54, in order to suppress stray radiation components resulting from unwanted reflections on the faces of the prisms 51-54.

The spectral bands of spectrophotometric measurements of the device 100, which are determined by the filters, may be located in the near infrared. These spectral bands may be, for example: [757.8 nm; 767.5 nm] for band B1, [1593.8 nm; 1717.2 nm] for band B2, [2018.8 nm; 2048.5 nm] for band B3, and [1782.4 nm; 1707.0 nm] for band B4. These spectral bands are adapted in particular for a space mission for characterizing gas flows of carbon compounds which occur at the Earth's surface.

The following numerical values may also be adopted for the optical components of the device 100, again by way of example:

- focal length of the telescope 10: about 122 mm
- dimensions of the entrance pupil of the telescope 10: about 40×26 mm$^2$
- dimensions of each of the slits 41-44: about 0.05 mm×1.30 mm, producing a width of about 100 pixels for each of the geometric bands B1-B4 along detection direction D2
- dimensions of the diffraction grating 24: about 80 mm×54 mm
- line density of diffraction grating 24: 60.39 lines per millimeter, producing the following orders of diffraction: 40 for band B1, 19 for band B2, 15 for band B3, and 18 for band B4
- blaze angle of diffraction grating 24: 67.30°
- angle of incidence of radiation on the diffraction grating 24: 70.30°
- focal length of the spectrophotometer 20 in near-Littrow configuration: 243 mm
- size of the array detector 26: 1000×1000 pixels
- length of each of the geometric bands B1-B4 along detection direction D1: about 1000 pixels
- apex angles of pupillary separating prisms 31-34: 20.41° for prism 31 producing geometric band B1, 6.82° for prism 32 producing geometric band B2, 6.66° for prism 33 producing geometric band B3, and 18.63° for prism 34 producing geometric band B4, producing a spacing of about 150 pixels, along detection direction D2, between two adjacent geometric bands B1-B4.

Under these conditions, the device 100 may have a mass which is less than or approximately equal to 70 kg, and dimensions that are less than or approximately equal to 900 mm×620 mm×450 mm, including a cryostat for containing the spectrophotometer but excluding a baffle which would be arranged around the entrance E of the telescope 10.

Figure 6:
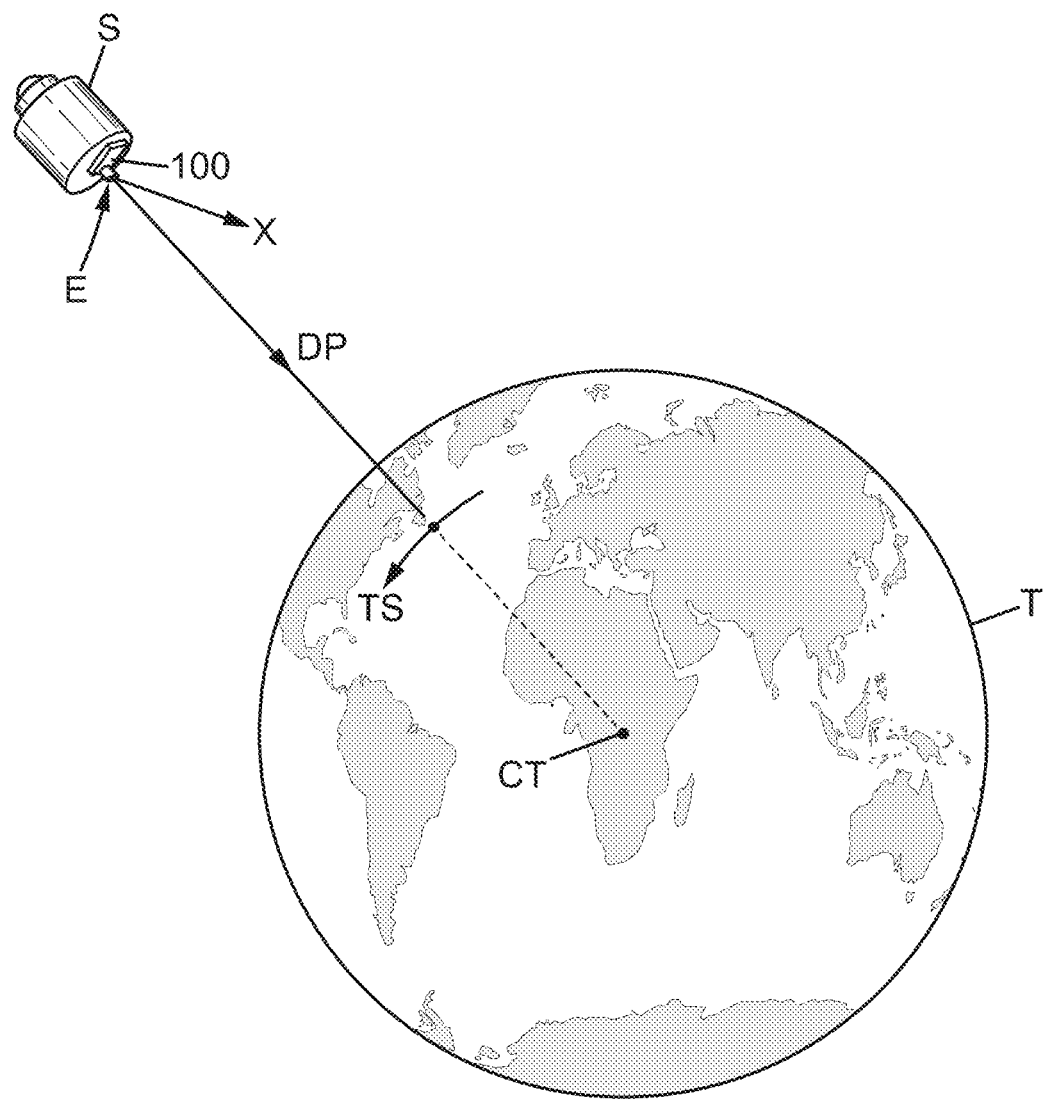
FIG. 6 shows a use of a spectrophotometric device according to the invention, on board a satellite.

Finally, FIG. 6 illustrates a use of the device 100 just described, on an artificial satellite. The satellite S is orbiting the Earth T. During use of the device 100, the satellite S is preferably oriented so that the pointing direction DP is directed toward the center CT of the Earth T. Thus, the pointing direction DP is oriented toward the nadir, as shown. In addition, the satellite S is also preferably rotated about the accordingly-oriented pointing direction DP so that the prismatic deflection direction X is perpendicular to the path of the satellite S along the ground, denoted by TS. In other words, the image of the earth's surface that is formed by the telescope 10 in the output focal plane PF advances in a direction which is perpendicular to the x direction. In this manner, spectrophotometric measurements may be obtained simultaneously in the four spectral bands, in order to characterize carbon compounds contained in the Earth's atmosphere along the pointing direction DP. Measurements obtained simultaneously is understood to mean measurements for which the simultaneity is limited only by the pixel readout constraints of the array detector 26.

It is understood that the invention can be reproduced by modifying its secondary aspects relative to the embodiments detailed above. In particular, it can be adapted to obtain a spectrophotometric device which has any number of spectral measurement bands. Finally, one will recall that all numerical values given were provided solely as non-limiting examples.

The invention claimed is:

1. A spectrophotometric device including a plurality of spectral measurement bands, comprising:
   a telescope having an entrance pupil (PE) and an output focal plane (PF), adapted to focus, in the output focal plane, radiation that enters the telescope through the entrance pupil;
   a spectrophotometer having an entrance which is superimposed on the output focal plane (PF) of the telescope, and comprising a spectral spreading component and an array detector which is optically conjugate with the entrance of the spectrophotometer, said detector having a photosensitive surface which extends in a first detection direction (D1) parallel to a direction of spectral spreading produced by the spectral spreading component, and which also extends in a second detection direction (D2) perpendicular to the first detection direction,
   a pupil mask arranged in the entrance pupil (PE) of the telescope (10) and having a plurality of apertures (O1-O4) forming separate sub-pupils which are respectively dedicated to the spectral measurement bands;
   pupillary separating prisms, which are arranged one-on-one against the apertures (O1-O4) of the pupil mask so that each pupillary separating prism deflects a portion of the radiation which passes through the corresponding sub-pupil in a prismatic deflection direction (X) which is common to all the pupillary separating prisms, and with a prismatic deflection amplitude which is different from that of every other pupillary separating prism, and the spectrophotometer being oriented relative to the pupillary separating prisms so that the second detection direction (D2) optically corresponds to the prismatic deflection direction through the telescope and the spectrophotometer;
   a plurality of curved slits which are distributed in the entrance of the spectrophotometer so that the longitudinal direction of the slits optically corresponds to the prismatic deflection direction (X) through the telescope, and the slits being offset from one another so that each receives through one of the apertures (O1-O4) of the pupil mask and one of the pupillary separating prisms, and through the telescope, a respective portion of the radiation which originates from a pointing direction (DP) of the telescope; and
   a first set of filters, each determining one of the spectral measurement bands, the filters of the first set being arranged in front of the photosensitive surface of the detector, each filter of said first set being effective within a detection aperture which is superimposed along the second detection direction (D2) on an image of only one of the slits, formed by the spectrophotometer with a portion of the radiation entering the telescope through a single one of the apertures (O1-O4) of the pupil mask, and the detection aperture of each filter extending in the first detection direction (D1).

2. The spectrophotometric device according to claim 1, further comprising at least one second set of filters, also having a one-to-one correspondence to the spectral measurement bands, and which are arranged at the pupillary separating prisms, or inside the spectrophotometer between the entrance of said spectrophotometer and the spectral spreading component, so that a filter of the first set and a filter of each second set which correspond to the same spectral band are traversed by a same portion of the radiation which has entered the telescope through only one of the apertures (O1-O4) of the pupil mask.

3. The spectrophotometric device according to claim 1, further comprising at least one field mask which is arranged close to the output focal plane (PF) of the telescope or in an intermediate image plane (PI) of the telescope, each field mask having apertures which correspond to the slits or which have images superimposed on said slits, said images being formed by a part of the telescope comprised between the field mask and the output focal plane of said telescope, with the radiation that entered the telescope through the apertures (O1-O4) of the pupil mask.

4. The spectrophotometric device according to claim 1, further comprising an additional set of prisms, referred to as pupillary alignment prisms, which are arranged one-on-one against the slits and are adapted to superimpose onto each other, on said spectral spreading component, all radiation portions coming from the slits after each has entered the telescope through one of the apertures (O1-O4) of the pupil mask.

5. The spectrophotometric device according to claim 1, wherein the spectral spreading component is a diffraction grating, and the spectrophotometer is arranged so that the radiation which has entered the telescope through the apertures (O1-O4) of the pupil mask is reflected by the diffraction grating.

6. The spectrophotometric device according to claim 1, further comprising a polarization scrambler which is arranged upstream of the entrance pupil (PE) of the telescope relative to a direction of propagation of the radiation in the telescope, said polarization scrambler being suitable for mixing different polarizations in each portion of the radiation which passes through one of the apertures (O1-O4) of the pupil mask.

7. The spectrophotometric device according to claim 1, comprising at least N apertures (O1-O4) in the pupil mask, N pupillary separating prisms, N slits, and N filters in the first set of filters, to enable simultaneous spectrophotometric measurements in N spectral bands, where N is an integer between 2 and 12, or equal to 2 or 12, or between 4 and 8, or equal to 4 or 8.

8. The spectrophotometric device according to claim 1, wherein the pupil mask comprises an additional aperture (O5), and the device further comprises an imaging system and a beam splitting component which is arranged in an exit pupil (PS) of the telescope, said beam splitting component being adapted so that an additional portion of the radiation which entered the telescope through the additional aperture of the pupil mask is transmitted to the imaging system, while the portions of the radiation which entered the telescope through said apertures (O1-O4) of the pupil mask are transmitted in the direction of the slits.

9. A method for measuring chemical components present within a measurement area in the Earth's atmosphere, comprising:
   a) installing on board a satellite (S) a spectrophotometric device with a plurality of spectral measurement bands according to claim 1;
   b) placing the satellite (S) in orbit around the Earth (T), so that the satellite flies over the measurement area;
   c) orienting the pointing direction (DP) of the telescope towards the measurement area; and
   d) while the pointing direction (DP) of the telescope is maintained towards the measurement area, activating the detector of the spectrophotometer and capturing readout signals from pixels of the detector, said readout signals providing, separately within geometric bands (B1-B4) in the photosensitive surface of the detector which are optically associated one-to-one with the slits through the spectrophotometer, a spectral intensity distribution of the radiation which originates from the measurement area in one of the spectral measurement bands.

10. The method according to claim 9, wherein the satellite (S) is oriented so that the pointing direction (DP) of the telescope is superimposed on a nadir direction of the satellite during step d).

11. The method according to claim 9, wherein the satellite (S) is oriented so that the prismatic deflection direction (X) is perpendicular to an advancement direction of an image of the measurement area formed by the telescope in the output focal plane (PF), during step d).

12. The method according to claim 9, wherein at least one of the spectral measurement bands of the device comprises an absorption line of at least one gaseous carbon compound, such as carbon dioxide or an aerosol compound.

* * * * *